Feb. 9, 1926.
R. A. WEEKS
TRAILER COUPLING
Filed Oct. 4, 1922
1,572,056
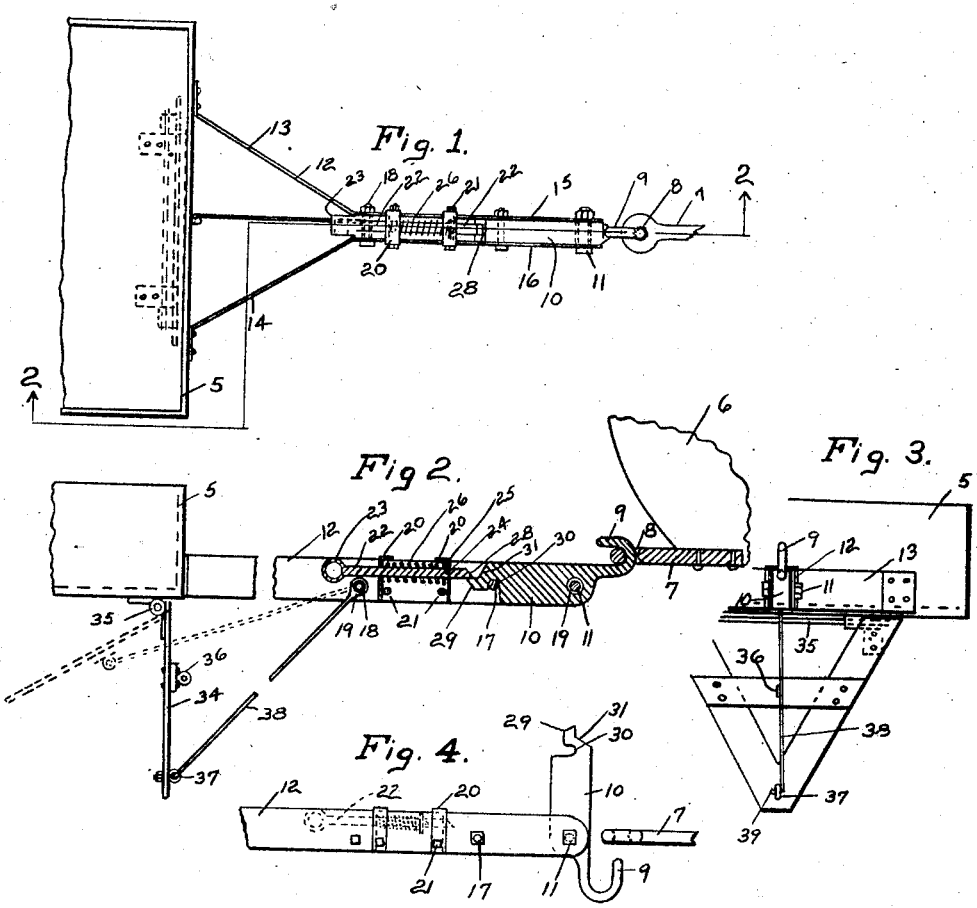

Patented Feb. 9, 1926.

1,572,056

UNITED STATES PATENT OFFICE.

ROBERT A. WEEKS, OF WISCONSIN RAPIDS, WISCONSIN.

TRAILER COUPLING.

Application filed October 4, 1922. Serial No. 592,253.

*To all whom it may concern:*

Be it known that I, ROBERT A. WEEKS, a citizen of the United States, residing at Wisconsin Rapids, county of Wood, and State of Wisconsin, have invented new and useful Improvements in Trailer Couplings, of which the following is a specification.

This invention relates to improvements in trailer couplings.

It is an object of this invention to provide an instantly releasable and attachable trailer coupling with which a trailer can be associated with a towing vehicle in a universally jointed relation, whereby great flexibility is assured.

It is a further object of this invention to provide means for securing a trailer to a power driven vehicle without the use of a coupling-pin. As will be shown hereinafter, an extremely simple, pivotally mounted hook is used to effect the coupling and means is provided for locking the hook in place to secure it against accidental release.

Further objects of this invention are to provide means for partially relieving the pivot-pin of a coupling-hook from strain; to provide an automatically operable and quickly releasable bolt for securing the coupling-hook in its operative position; to provide a conveniently accessible support for the forward end of the trailer in association with a coupling device of this sort, and to provide a trailer coupling which can be economically and cheaply manufactured and readily attached to the vehicles with which it is designed for use.

In the drawings:—

Fig. 1 is a plan view of a device embodying this invention.

Fig. 2 is a section taken on line 2—2 of Fig. 1.

Fig. 3 is a fragmentary front elevation of the device shown in Figs. 1 and 2.

Fig. 4 is a detail view in side elevation showing the device in position for use.

Like parts are identified by the same reference characters throughout the several views.

The trailer body is shown at 5 and a portion of the power actuated towing vehicle is represented at 6. A member 7 secured to the towing vehicle is apertured at 8 to receive the hook-shaped portion 9 of a member 10 pivotally mounted at 11 in a specially constructed frame 12 which is attached to the forward end of trailer 5. It will be understood that the precise method by which the apertured member 7 and the frame 12 are secured to their respective vehicles is immaterial to this invention. Any desired securing means may be employed.

The frame 12 preferably comprises a pair of strap iron members 13 and 14 which converge as they extend forwardly from the front end of the trailer. The forward portions of the strap iron members 13 and 14 are bent to constitute the spaced and substantially parallel side members 15 and 16 respectively. These members are secured together by the pivot bolt 11, by bolt 17, and by bolt 18. The bolts 11 and 18 are preferably inserted through spacing bushings 19 which serve to keep members 15 and 16 spaced at a given distance, whereby the pinching by said members of the elements pivotally mounted upon said bolts is prevented. The bolt 17 may be provided with a similar bushing if so desired, although a bushing is not as necessary at this point as it is in connection with bolts 11 and 18.

A pair of centrally apertured stampings 20 secured to the frame 12 by bolts 21 serve to support the latch bolt 22 which is preferably provided with a hook 23 for its ready manipulation. A pin 24 extending transversely through the latch bolt confines against movement thereon a washer 25 which serves as a seat for spring 26. At its other end the spring 26 seats against one of the stampings 20 and is thereby arranged to actuate the bolt 22 forwardly while rendering it resiliently yieldable rearwardly. The forward movement of the latch bolt is limited by the pin 24 encountering the stamping 20.

The latch bolt 22 is provided at its forward end with an angularly cut extremity 28 against which the heel 29 of the hook member 10 is adapted to act with a cam-like movement to force the latch bolt rearwardly. The hook member 10 is recessed at 30 to receive bolt 17 and is notched at 31 to an extent sufficient to permit the latch bolt to move forwardly into operative relation above the heel 29 when the hook member 10 is engaged over bolt 17.

A rearwardly and upwardly foldable leg or support 34 is preferably provided for the forward end of the trailer, whereby the trailer can be maintained in an upright position pending its attachment to a towing vehicle. The leg 34 is hingedly connected with the trailer by a bolt 35 about which the leg is movable between its full line and dotted line positions shown in Fig. 2. A pair of eyes 36 and 37 are provided upon an intermediate portion of said leg and upon its lower end respectively. A brace rod 38 engageable alternatively with either of the eyes 36 or 37 is pivotally mounted upon the bushing 19 of cross bolt 18. By means of rod 38 which is provided at its end with a hook 39 engageable in either of the eyes 36 or 37 the supporting leg 34 can be braced in either of the positions to which it is movable in the manner indicated in Fig. 2.

In the use of a device embodying this invention it will be understood that the trailer will ordinarily be supported by the leg 34 disposed in the position in which it is shown in full lines in Fig. 2. The leg is secured in that position by means of the brace rod 38 which is hooked into the eye 37 of the leg.

With the apertured member 7 of the towing vehicle in position to receive the hook 9, the hook 10 is turned about its pivot upon bolt 11 to the position in which it appears in Fig. 4. Thereupon the entire frame 12 is lifted to thread the hook 9 through the aperture 8. Thereafter member 10 is swung about pivot 11 to the position in which it is shown in Fig. 2. As the heel 29 of hook member 10 passes the cam surface 28 of latch bolt 22 the latch bolt will be forced rearwardly. Eventually, however, the notch 31 will come into registry with said latch bolt and the spring 26 will force the latch bolt forwardly into locking engagement with hook member 10.

The coupling between the trailer and the towing vehicle is now complete and it will be noted that a universal connection is established between the open vehicles, thereby affording the desired flexibility both for lateral and vertical movement.

By the simple operation of unhooking the brace rod 38 upon eye 37, swinging the leg 34 to its dotted line position as shown in Fig. 2 and hooking the brace rod 38 in eye 36 the leg is readily secured in an out-of-the-way position and the towing vehicle may proceed to the desired point.

Upon arrival at the desired point the trailer may again be given support by moving the leg and brace to the position shown in full lines in Fig. 2. The ring or eye 23 upon the latch bolt 22 may now be fixed manually to draw the latch bolt rearwardly and thereby effect the release of the heel portion 29 of hook member 10. Thereafter the entire frame 12 of the device may be lifted slightly, causing the lower portions of the hook 9 to impinge upon the member 7 thereby rotating the hook above its pivot upon bolt 11 to the position in which it appears in Fig. 4. The downward movement of the frame 12 at this time will allow the hook 9 to pass downwardly out of the opening 8 in member 7, thereby breaking the connection between the trailer and its towing vehicle.

It will be understood from the foregoing that the device is very easily operated and that the objects of this invention are entirely satisfied. In addition it should be noted that there is very little strain upon the latch bolt 22 since, if there is any downward pressure whatever upon the frame 12, the member 10 will tend to remain in its operative locked position. It is to be noted further that with the member 10 in its operative locked position in which it appears in Fig. 2 the pivot bolt 11 is relieved, to some extent, of the tractive force of the towing vehicle by means of the provision of the additional bolt 17 with which the notched member 10 is adapted to interact.

The frame 12 provides a convenient support forwardly of the body 5 of the trailer, from which support the leg 34 can conveniently be braced in operative or inoperative position in the manner indicated.

Where a four-wheeled trailer is used it will be obvious that the leg 34 will not ordinarily be needed, and it will also be obvious that some modification of the attachment of frame 12 to the trailer will be expedient. Any of the attaching devices suitable for such vehicles may be used however, the frame 12 being such as to lend itself to use with any desired attaching means.

I claim:—

1. A trailer coupling including a pair of spaced members, a bolt connecting said members, a sleeve upon said bolt spacing said members apart, a hook-carrying element pivotally mounted upon said sleeve and provided with a notch at a point remote from said sleeve, transversely disposed means between said spaced members receivable within said notch and adapted to relieve said bolt and sleeve of load, a detent normally urged toward said element and engageable therewith to secure said element in interlocked engagement with said means, and a rearwardly opening hook carried by said element and arranged to be operative for coupling purposes when said element is interlocked as aforesaid.

2. A trailer coupling including a pair of spaced members, a bolt connecting said members, a sleeve upon said bolt spacing said members apart, a hook-carrying element pivotally mounted upon said sleeve and provided with a notch at a point remote from said sleeve, transversely disposed means between said spaced members receivable within said notch and adapted to relieve said bolt and sleeve of load, a detent adapted to secure said element in interlocked engagement with said means, and a rearwardly opening hook carried by said element and arranged to be operative for coupling purposes when said element is interlocked as aforesaid, said hook being disposed forwardly of the pivotal mounting of said element and adapted under load to maintain said element in operative interlocked position.

3. A trailer coupling including the combination with a pair of spaced members connected by bolts, of a hook pivotally supported from said members upon one of said bolts and provided with means adapted in one position of said hook to interact with another of said bolts, and a detent normally urged toward said means and engageable therewith to maintain said hook in said position.

4. The combination with a pair of spaced members connected by bolts, of a hook pivotally supported from said members and provided with means adapted in one position of said hook to interlock with one of said bolts, a detent slidable between said members and engageable with said means to maintain said hook in interlocked engagement as aforesaid, and means normally urging said detent into operative position.

5. A trailer coupling including the combination with a pair of spaced members and connecting means therefor, of a coupling hook pivotally supported between said members and provided with means adapted in one position of said hook for interlocking engagement with said connecting means, a detent slidable between said members and adapted when operative to maintain said hook in said position, means normally urging said detent into operative position, and means for automatically retracting said detent during the movement of said hook towards said position, said detent being manually retractable to release said hook.

6. The combination with a member adapted to be supported from a trailer, and an eye adapted to be supported from a towing vehicle, of a hook pivotally supported from said member and provided with an interlocking recess, means projecting from said member and adapted in one position of said hook to be received within said recess, said hook being adapted to make an operatively permanent coupling with said eye in said position, a detent slidable with reference to said member and normally operative to lock said hook in said position, and means for automatically retracting said detent to permit the passage of said hook towards said position.

7. A trailer coupling including the combination with a pair of spaced members connected by a plurality of bolts, of a hook-carrying element pivotally mounted for rotation about one of said bolts, a rearwardly opening hook associated with said element, an eye adapted to be secured to a towing vehicle and adapted in operative position of said hook to constitute a flexible coupling therewith, means for interlocking said element with one of said bolts when said hook is in operative position, a detent slidable longitudinally between said spaced members and adapted to secure said element with said hook in said position, a spring arranged to urge said detent into a position for engagement with said element, and a cam surface upon said detent adapted to be acted upon by said element whereby said detent is automatically retracted to permit said element to move in one direction.

8. A trailer coupling adapted for use in coupling a two-wheeled trailer to a towing vehicle, said coupler comprising an apertured member adapted to be secured to the towing vehicle, a coupling frame adapted to be secured to the trailer, a coupling-hook pivotally mounted with respect to said frame and movable between a horizontal and vertical position, said hook being receivable within the aperture of said member in its vertical position and being adapted in its horizontal position to constitute with said apertured member a flexible coupling, means associated with said frame for limiting the movement of said hook past its horizontal position and for interlocking said hook with said frame in its horizontal position, said hook being arranged to retain its horizontal position when said frame is subjected to load.

9. A trailer coupling adapted for use in coupling a two-wheeled trailer to a towing vehicle, said coupler comprising an apertured member adapted to be secured to the towing vehicle, a coupling frame adapted to be secured to the trailer, a coupling-hook pivotally mounted with respect to said frame and movable between a horizontal and vertical position, said hook being receivable within the aperture in its horizontal position to constitute with said apertured member a flexible coupling, means associated with said frame for limiting the movement of said hook past its horizontal position and for interlocking said hook with said frame in its horizontal position, and automatically operable manually releasable means for securing said hook in its horizontal position, said hook being arranged to retain its horizontal position when said frame is subjected to load.

10. A coupling device for securing a two-wheeled trailer to a towing vehicle, said device including an apertured member adapted to be secured to said towing vehicle, a coupler frame adapted to be secured to the trailer and provided with a pair of spaced members connected by a plurality of bolts, a hook pivotally supported for rotation about one of said bolts and adapted in its operative position for engagement with said aperturured member to interlock with another of said bolts, whereby the pivot bolt is relieved of strain, a detent, means for supporting said detent between said spaced members for longitudinal movement to and from a position for locking said hook, a leg hingedly associated with said trailer, and a brace pivotally supported upon one of said bolts and engageable with said leg at a plurality of points, whereby said leg may be supported by said brace and by said coupler frame in operative or inoperative position.

11. In a trailer coupling the combination with a coupling support, of a hooked member pivotally supported from said coupling support and recessed to receive a portion of said support when said hook is in its coupling position, and a detent resiliently actuated toward said hooked member and provided with means whereby said hooked member may actuate said detent away from said hooked member when said hook is moved to coupling position, said hooked member being provided with a shoulder portion for engagement with said detent when said hook is in coupling position, whereby to interlock said hook with its support.

ROBERT A. WEEKS.